United States Patent
Cueva Gonzalez et al.

(10) Patent No.: US 9,304,561 B2
(45) Date of Patent: Apr. 5, 2016

(54) POWER MANAGEMENT IN A CIRCUIT

(71) Applicant: Intel Corporation, Santa Clara, CA (US)

(72) Inventors: Alfredo Cueva Gonzalez, Zapopan (MX); Miguel Cervantes Lopez, Zapopan (MX); Arturo Sanchez Hernandez, Tlaquepaque (MX); Georges Faure Vaquero, Zapopan (MX); Richard Stamey, Beaverton, OR (US); Jeffrey Colwell, Dupont, WA (US); Gautam Nath, Olympia, WA (US); Juan Ramirez Aguilar, Tlajomulco de Zuniga (MX)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 14/014,918

(22) Filed: Aug. 30, 2013

(65) Prior Publication Data

US 2015/0067376 A1    Mar. 5, 2015

(51) Int. Cl.
*G06F 1/00* (2006.01)
*G06F 11/30* (2006.01)
*G06F 1/26* (2006.01)

(52) U.S. Cl.
CPC .......................... *G06F 1/26* (2013.01)

(58) Field of Classification Search
CPC ........................................................ G06F 1/26
See application file for complete search history.

(56) References Cited

U.S. PATENT DOCUMENTS

| | | | |
|---|---|---|---|
| 5,861,684 A * | 1/1999 | Slade | H02J 1/06 307/150 |
| 5,872,983 A | 2/1999 | Walsh et al. | |
| 7,710,741 B1 | 5/2010 | Kelleher et al. | |
| 7,734,953 B1 | 6/2010 | Sivertsen et al. | |
| 8,724,422 B1 * | 5/2014 | Agness et al. | 365/229 |
| 2003/0075984 A1 * | 4/2003 | Ho | G06F 1/189 307/43 |
| 2004/0174642 A1 * | 9/2004 | Needham | G06F 1/263 361/18 |
| 2005/0046467 A1 * | 3/2005 | Kase et al. | 327/541 |
| 2008/0168257 A1 | 7/2008 | Marks et al. | |
| 2009/0034141 A1 * | 2/2009 | Tonry | G06F 1/305 361/92 |
| 2009/0115258 A1 * | 5/2009 | Flynn et al. | 307/129 |
| 2011/0304966 A1 | 12/2011 | Schrempp | |

* cited by examiner

*Primary Examiner* — Mohammed Rehman
(74) *Attorney, Agent, or Firm* — International IP Law Group, P.L.L.C.

(57) ABSTRACT

The present disclosure is generally related to power management in a circuit on a circuit board of a processor. The circuit includes a first power connector coupled to a first power input rail. The circuit includes a second power connector and a second power input rail. The circuit includes a control module. The control module is configured to determine a power specification of the circuit board. The control module is configured to detect a power cable connected to the first control connector. The control module is configured to sense a voltage at the second power connector. The control module is configured to couple the second power input rail with the first power connector or the second power connector in response to the determined power specification of the circuit board and the sensed voltage at the second power connector.

20 Claims, 5 Drawing Sheets

| Voltage Sensed at 2x3 Connector | Board Power Requirement | Power Received by 2x4 Connector | Steering |
|---|---|---|---|
| 0 V | 225 W | 150 W | On |
| 0 V | 300 W | 150 W | Off |
| 12 V | 225 W | 75 W | Off |
| 12 V | 300 W | 150 W | Off |

POWER MANAGEMENT IN A CIRCUIT

TECHNICAL FIELD

The present disclosure is generally related to a power circuit. More specifically, the present disclosure is generally related to a power circuit of a computer processor.

BACKGROUND

A computer processor is hardware in a computer system responsible for performing arithmetical, logical, and input/output operations of a computer program. The computer processor can be carried on a circuit board connected to a motherboard. The computer processor can receive power from a power supply unit in the computer system, or from the motherboard. Power is supplied to various components in the computer processor.

BRIEF DESCRIPTION OF THE FIGURES

The following detailed description may be better understood by referencing the accompanying drawings, which contain specific examples of numerous objects and features of the disclosed subject matter.

DETAILED DESCRIPTION

The present disclosure is generally related to a computer processor on a circuit board. Embodiments discussed herein provide methods and systems for delivering and managing power in the circuit board, which may unified input/output (I/O). The circuit board can have a plurality of power connectors to receive power for the computer processor. The received power can be delivered via power input rails to a plurality of voltage rails, which in turn can supply power to components of the computer processor. However, if a power connector is not receiving power from a connected power cable, the circuit board may not receive the specified amount of power. Thus, the voltage rails are unable to deliver power to the components of the computer processor. Furthermore, if the voltage difference across the voltage rails is too high, the lifespan of the computer processor may be shortened due to internal transistor wear.

A power steering circuit on the circuit board can ensure that the circuit board can receive the specified amount of power even when a power connector is not connected to a power cable. Additionally, a power down circuit can ensure that the voltage difference across the voltage rails during operations such as powering up and powering down do not exceed a certain limit.

Figure 1:
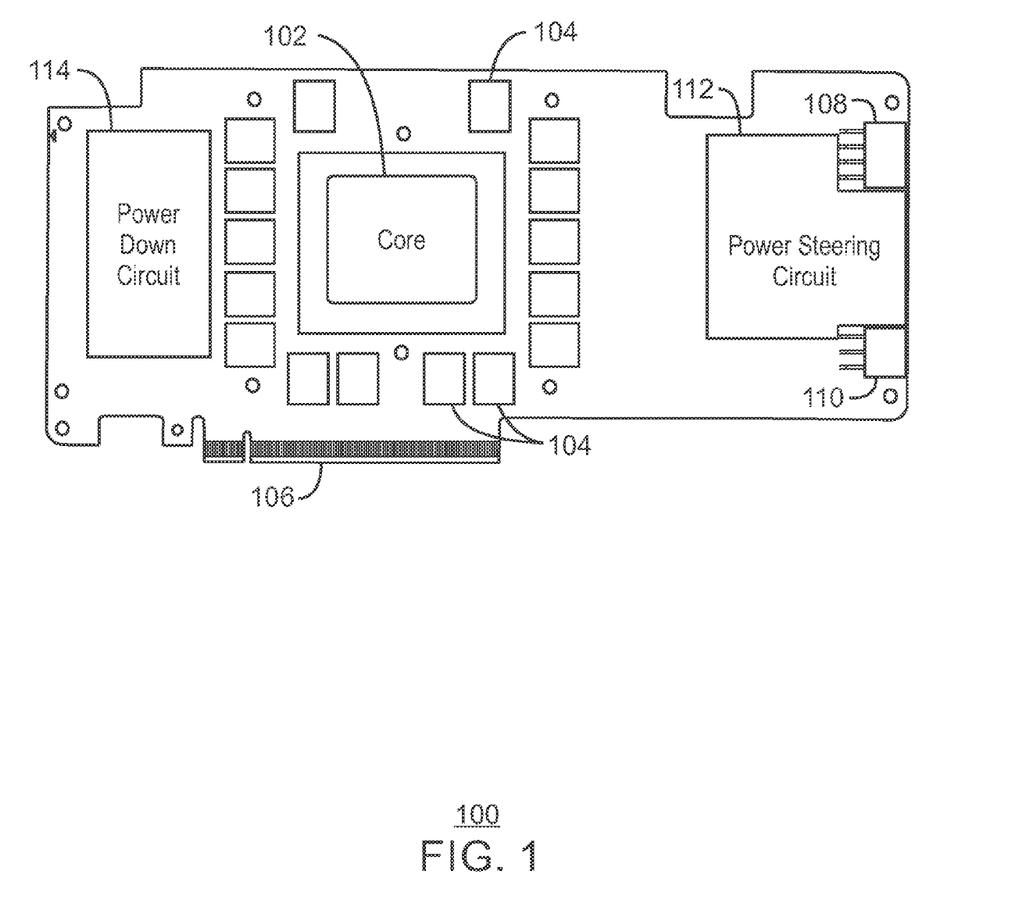
FIG. 1 is an illustration of a circuit board for a processor, in accordance with embodiments.

FIG. 1 is an illustration of a circuit board for a processor, in accordance with embodiments. The circuit board 100 can include a core 102 and memory 104 to perform the functions of the processor. The circuit board 100 can also include an edge connector 106 that can function as an interface with a motherboard. The circuit board 100 can further include a first power connector 108 and a second power connector 110. The first power connector 108 and the second power connector 110 can interact with power cables from a power supply unit to deliver power to the processor. The circuit board 100 may have a specific power specification. In some embodiments, the first power connector 108 and the second power connector 110 are configured to interact with different types of power cables. In some embodiments, power can also be delivered through the edge connector 106. The edge connector 106, the first power connector 108, and the second power connector 110 can each be coupled to a power input rail. The power input rails can deliver power to a number of voltage regulators, which in turn supply power to voltage rails of the core 102, the memory 104, and other components of the processor.

The circuit board 100 also includes a power steering circuit that routes power to the circuit board 100 in response to connections between the power connectors 108, 110 and power cables. The power steering circuit 112 can be coupled to the first power connector 108 and the second power connector 110. The power steering circuit 112 can detect power cable connections at the first power connector 108 and the second power connector 110, and take action to ensure that sufficient power is being supplied to the circuit board 100. The circuit board 100 can also include a power down circuit 114 that controls the voltage levels of the voltage rails during circuit board activities. The power down circuit can be coupled to the voltage rails. The power down circuit 114 can ensure that the voltage difference across the voltage rails during operations such as powering up and powering down do not exceed a certain limit.

The processor may be a multi-core processor. The circuit board 100 may be a Peripheral Component Interconnect Express (PCIe) board. The circuit board 100 may have a power specification of 225 W or 300 W to operate. The edge connector 106 may be a 12V PCIe edge connector, configured to accept 75 W from the motherboard. The first power connector 108 may be a 12V 2×4 power connector, configured to accept 75 W from a 2×3 power cable, or 150 W from a 2×4 power cable. The second power connector 110 may be a 12V 2×3 power connector, configured to accept 75 W from a 2×3 power cable.

Figure 2:
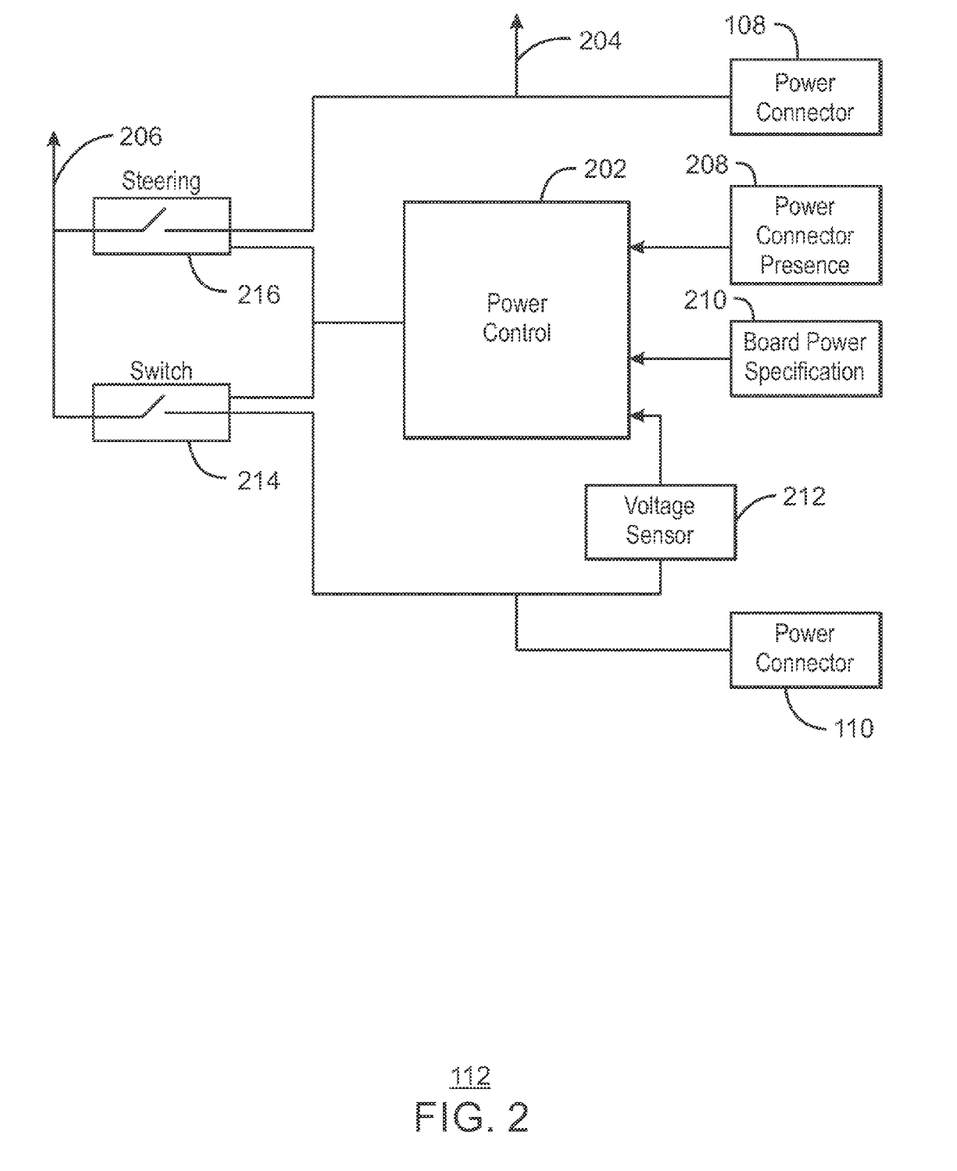
FIG. 2 is a block diagram of a power steering circuit, in accordance with embodiments.

FIG. 2 is a block diagram of a power steering circuit, in accordance with embodiments. The power steering circuit 112 can be located on the circuit board 100 of a processor. The power steering circuit 112 can be configured to route the specification amount of power to the circuit board 100 in response to the power connections detected by the power steering circuit 112.

The power steering circuit 112 can include a power control module 202 to control the activities of the power steering circuit 112. The power steering circuit 112 can include a first power input rail 204 and a second power input rail 206 to distribute power to the voltage rails of the processor. The first power input rail 204 may be coupled to the first power connector 108. The second power input rail 206 can be coupled to either the first power connector 108 or the second power connector 110.

The power control module 202 can detect a presence of the first power connector 108. The power control module 202 detect if the first power connector 108 is connected to a power cable. In some embodiments, the power control module 202 can determine what type of power cable is connected to the first power connector 108 and how much power is being delivered through the first power connector 108 by means of a power connector presence logic 208. In some embodiments, the first power connector 108 is a 12V 2×4 power connector, and the power control module 202 can detect if the first power connector 108 is receiving 75 W from a 2×3 power cable or 150 W from a 2×4 power cable.

The power control module 202 can also determine a board power specification for the circuit board 100. In some embodiments, the board power specification can be 225 W or 300 W.

The power control module 202 can also include a voltage sensor 212 to sense a voltage at the second power connector 110. If the sensed voltage is zero, or near zero, the power control module 202 determines that the second power connector 110 is not connected to a power cable. If the sensed voltage is nonzero (for example, 12 V), the power control module 202 determines that the second power connector 110 is connected to a power cable. In some embodiments, the power control module 202 can determine if a power cable is connected to the second power connector 110 and how much power is being delivered through the second power connector 110 by reading the voltage sensor 212. In some embodiments, the second power connector 110 is a 12V 2×3 power connector, and the power control module 202 can detect that the second power connector is receiving 75 W from a 2×3 power cable. In some embodiments, the power control module 202 can require that the sensed voltage be held stable for a predetermined amount of time (for example, 25 to 30 μs) before any determination is made.

In response to the board power specification 210 and the sensed voltage, the power control module 202 can couple the second power input rail 206 to either the first power connector 108 or the second power connector 110. The power control module 202 can couple the second power connector 110 to the second power input rail 206 by enabling a switch module 214 and disabling a steering module 216. The power control module 202 can couple the first power connector 110 to the second power input rail 206 by disabling the switch module 214 and enabling the steering module 216.

In some embodiments, the switch module 214 is enabled and the steering module 216 is disabled by default. If the power control module 202 determines that the second power connector 110 is not connected to a power cable, then the power control module 202 may couple the first power connector 108 to the second power input rail 206 if the amount of power being delivered through the first power connector 108 is sufficient such that the board power specification is met. If the power control module 202 determines that the second power connector 110 is connected to a power cable, then the power control module 202 may couple the second power connector 108 to the second power input rail 206, assuming that the board power specification is met.

Figure 3:
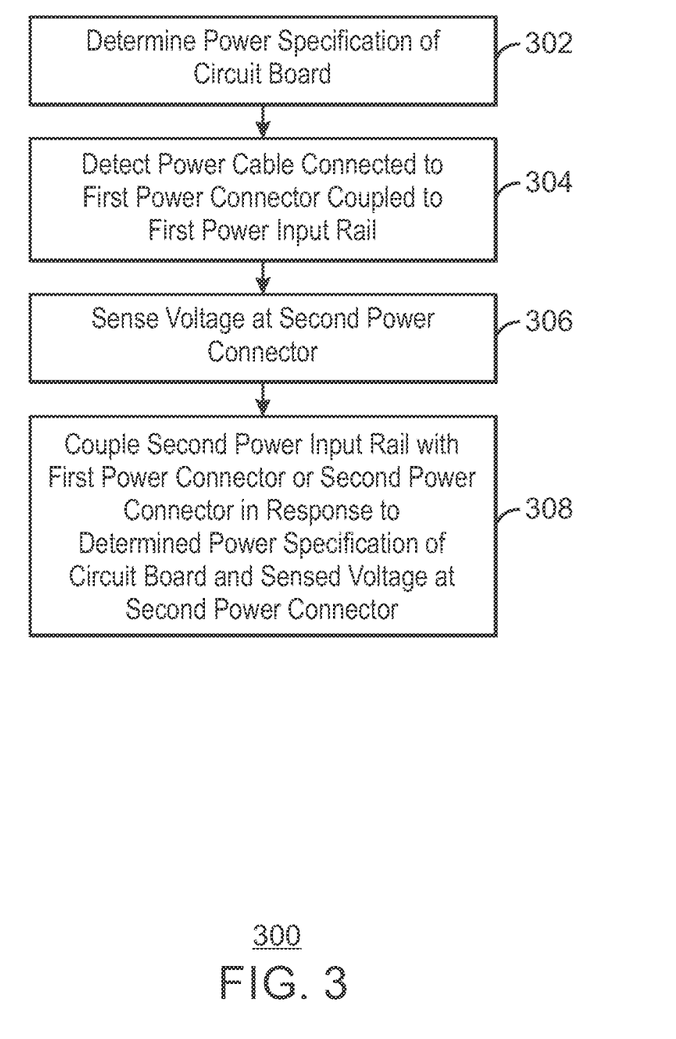
FIG. 3 is a process flow diagram of a method for supplying power to a circuit board.

FIG. 3 is a process flow diagram of a method for supplying power to a circuit board. The method 300 can be performed by a power steering circuit 112 of a processor. The power steering circuit can receive power through a pair of power connectors, and deliver the received power to the circuit board via a pair of power input rails.

At block 302, the power steering circuit determines a power specification of the circuit board. The power specification may be stored in a memory unit of the circuit board for easy access from the power steering circuit. In some embodiments, the circuit board includes an edge connector to receive power from a motherboard.

At block 304, the power steering circuit detects a power cable connected to a first power connector coupled to a first power input rail. The power steering circuit can detect what type of power cable is connected to the first power connector as well as how much power is being delivered through the first power connector.

At block 306, the power steering circuit senses a voltage at a second power connector. If the sensed voltage is zero, or near zero, the power steering circuit can determine that the second power connector is not connected to a power cable. If the sensed voltage is nonzero, the power steering circuit can determine that the second power connector is connected to a power cable. In some embodiments, the power steering circuit only determines whether a power cable is connected if the sensed voltage remains relatively constant after a predetermined amount of time. The power steering circuit can detect if a power cable is connected to the second power connector as well as how much power is being delivered through the second power connector.

At block 308, the power steering circuit couples a second power input rail with the first power connector or the second power connector in response to the determined power specification of the circuit board and the sensed voltage at the second power connector. If the second power connector is not connected to a power cable, then the power steering circuit can couple the second power input rail with the first power connector, provided that the total amount of power received by the first power connector (and the edge connector) meets the power specification of the circuit board. If the total amount of power received does not meet the power specification, then the second power input rail is de-coupled from the first power connector. If the second power connector is connected to a power cable, then the power steering circuit can couple the second power input rail with the second power connector, provided that the total amount of power received by the first power connector and the second power connector (as well as the edge connector) meets the power specification of the circuit board.

Figure 4:
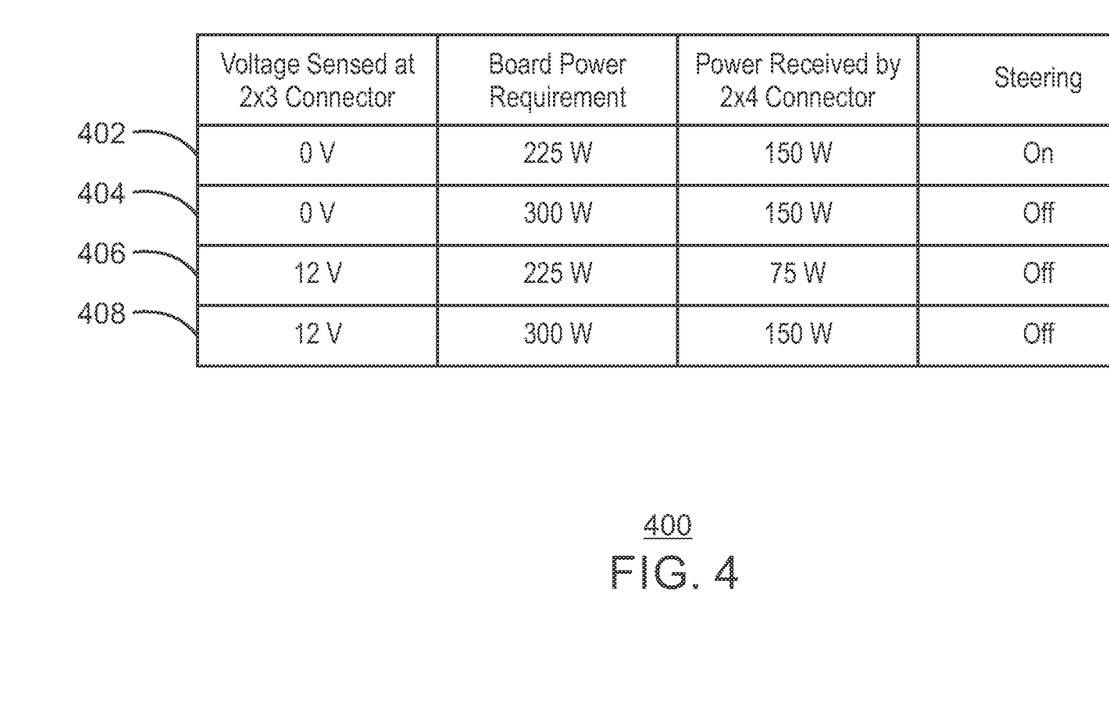
FIG. 4 is a chart showing power management scenarios for an embodiment of a power steering circuit, in accordance with embodiments.

FIG. 4 is a chart showing power management scenarios for an embodiment of a power steering circuit, in accordance with embodiments. A Peripheral Component Interconnect Express (PCIe) board (as described with regards to FIG. 2) includes a power steering circuit, a 12V 2×4 power connector, a 12V 2×3 power connector, and a PCIe edge connector. The power specification of the PCIe board can be 225 W or 300 W. The PCIe edge connector can receive 75 W from a motherboard. The 2×4 power connector can receive 75 W from a 2×3 power cable or 150 W from a 2×4 power cable. The 2×3 power connector can receive 75 W from a 2×3 power cable. A first power input rail can be coupled to the 2×4 power connector. A second power input rail can be coupled to either the 2×4 power connector or the 2×3 power connector. The actions performed by the power steering circuit can be dependent on the power specification of the PCIe board and the voltage sensed at the 2×3 power connector. The chart 400 details four possible scenarios, each represented by a row.

At row 402, the power steering circuit senses zero voltage at the 2×3 power connector, indicating that the 2×3 power connector is not connected to a power cable. The power specification of the PCIe board is 225 W. The 2×4 power connector is receiving 150 W from a 2×4 power cable. The total amount of power received by the 2×4 power connector and the PCIe edge connector meets the power specification of the PCIe board. Thus, the power steering circuit enables steering, coupling the 2×4 power connector to the second power input rail.

At row 404, the power steering circuit senses zero voltage at the 2×3 power connector, indicating that the 2×3 power connector is not connected to a power cable. The power specification of the PCIe board is 300 W. The 2×4 power connector is receiving 150 W from a 2×4 power cable. The total amount of power received by the 2×4 power connector and the PCIe edge connector does not meet the power specification of the PCIe board. Thus, the power steering circuit does not enable steering, and the 2×4 power connector is not coupled to the second power input rail.

At row 406, the power steering circuit senses 12 V at the 2×3 power connector, indicating that the 2×3 power connector is connected to a power cable. The power specification of the PCIe board is 225 W. The 2×4 power connector and the 2×3 power connector are each receiving 75 W from a 2×3 power cable. The total amount of power received by the 2×4 power connector, the 2×3 power connector, and the PCIe edge connector meets the power specification of the PCIe board. Thus, the power steering circuit does not enable steering, and the 2×3 power connector is coupled to the second power input rail.

At row 408, the power steering circuit senses 12 V at the 2×3 power connector, indicating that the 2×3 power connector is connected to a power cable. The power specification of the PCIe board is 300 W. The 2×4 power connector is receiving 150 W from a 2×4 power cable, and the 2×3 power connector is receiving 75 W from a 2×3 power cable. The total amount of power received by the 2×4 power connector, the 2×3 power connector, and the PCIe edge connector meets the power specification of the PCIe board. Thus, the power steering circuit does not enable steering, and the 2×3 power connector is coupled to the second power input rail.

Figure 5:
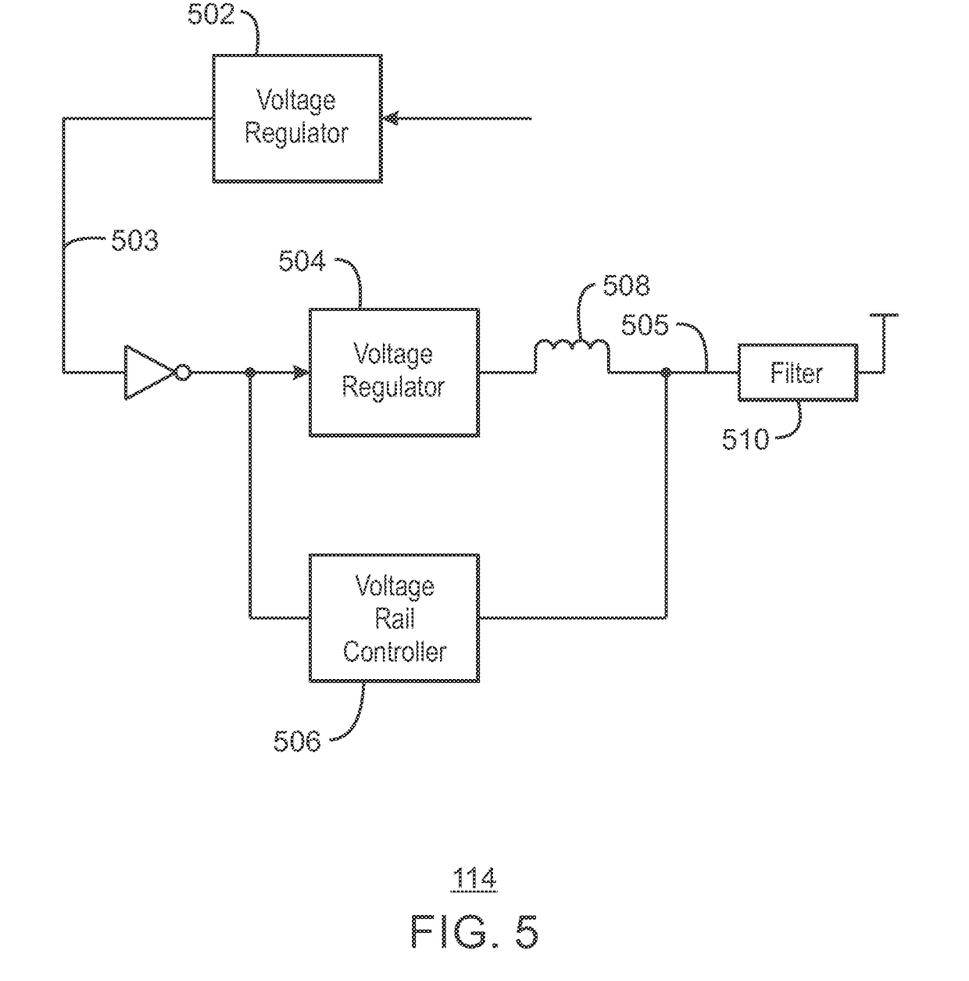
FIG. 5 is a block diagram of a power down circuit, in accordance with embodiments.

FIG. 5 is a block diagram of a power down circuit, in accordance with embodiments. The power down circuit 114 can be located on a circuit board 100 of a processor. The power down circuit 114 can be used by the circuit board 100 to help ensure that the voltage difference across the circuit board's voltage rails do not exceed a certain limit. The voltage rails are sourced by the voltage regulators which receive power from the circuit board's power connectors 108, 110 and edge connector 106.

The power down circuit 114 can include a first voltage regulator 502 coupled to a first voltage rail (not shown) and a second voltage regulator 504 coupled to a second voltage rail 505. The first voltage regulator 502 and the second voltage regulator 504 can be configured to supply and regulate power in the first voltage rail and the second voltage rail 505, respectively. The first voltage rail may be associated with Graphic Double Data Rate (GDDR) memory, and the second voltage rail 505 may be associated with a phase-locked loop (PLL). The first voltage rail and the second voltage 505 can deliver power to the core 102, memory 104, and other components on the circuit board 100. In some embodiments, the first voltage rail is a Voltage Drain for Graphic Processor Unit (VDDG) voltage rail. In some embodiments, the second voltage rail 505 is a Voltage of Super Filter Regulator (VSFR) voltage rail. In some embodiments, the first voltage regulator 502 receives power from the edge connector 106, the first power connector 108, and the second power connector 110. In some embodiments, the second voltage regulator 504 receives power from the edge connector 106. In some embodiments, the first voltage rail uses 1.0 V and the second voltage rail 505 uses 1.8 V. In some embodiments, the power down circuit 114 is configured to ensure that the voltage difference between the first voltage rail and the second voltage rail 505 does not exceed 1.0 V at any time.

A voltage rail controller 506 may be coupled to the second voltage regulator 504 and the second voltage rail 505. In some embodiments, an inductor 508 and a filter 510 are coupled to the second voltage rail 505. In some embodiments, the power down circuit 114 further includes a p-channel metal-oxide-semiconductor field-effect transistor (MOSFET), a first n-channel MOSFET, and a second n-channel MOSFET. The gate of the first n-channel MOSFET can be coupled to an output of the first voltage rail 502. The source of the first n-channel can be coupled to ground, and the drain can be coupled to an input enable of the second regulator 504 and to the voltage rail controller 506 at the gate of the second n-channel MOSFET. The source of the second n-channel MOSFET can be coupled to ground, and the drain can be coupled to the gate of the p-channel MOSFET. The source of the p-channel MOSFET can be coupled to an output of the second voltage rail 504, and the drain can be coupled to ground.

During power up, the first voltage regulator 502 is enabled. As the first voltage rail 502 nears its nominal voltage (for example, 1.0 V), the first voltage regulator 502 can assert an enable signal 503 to the second voltage regulator 504. The enable signal can cause the first n-channel MOSFET to be closed, thus connecting a low-enabled input of the second regulator 504 to ground, and powering up the voltage of the second voltage regulator 504. In regards to the voltage rail controller 506, the second n-channel MOSFET can be open, and a voltage (for example, 3.3 V) can be applied to the gate of the p-channel MOSFET. The p-channel MOSFET can remain open, allowing the normal operation of the second voltage regulator 504 and the second voltage rail 505. During the power up sequence, the voltage difference between the first voltage rail 502 and the second voltage rail 504 does not exceed a predetermined voltage limit (for example, 1.0 V).

During power down, the first voltage regulator 502 is shut down. As the first voltage rail 502 is consequently shutting down, the first voltage regulator 502 de-asserts the enable signal 503 to the second voltage regulator 504. This can cause the first n-channel MOSFET to be open, allowing voltage rail controller 506 to receive a voltage (for example, 3.3 V), thus shutting down the second voltage regulator 504. Thus, the second n-channel MOSFET can be closed, thus closing down the p-channel MOSFET in turn, and connecting the output of the second voltage regulator 504 to ground. The second voltage rail 504 can power down at a faster rate than the first voltage rail 502, such that the voltage difference between the first voltage rail 502 and the second voltage rail 504 does not exceed a predetermined voltage limit (for example, 1.0 V).

Example 1

A circuit for power management on a circuit board is described herein. The circuit may include a first power connector coupled to a first power input rail. The circuit may include a second power connector. The circuit may include a second power input rail. The circuit may include a power control module. The power control module may determine a power specification of the circuit board. The power control module may detect a power cable connected to the first power connector. The power control module may sense a voltage at the second power connector. The power control module may couple the second power input rail with the first power connector or the second power connector in response to the determined power specification of the circuit board and the sensed voltage at the second power connector.

Example 2

A method for power management in a circuit is described herein. The method may include determining a power specification of a circuit board. The method may include detecting a power cable connected to a first power connector coupled to a first power input rail. The method may include sensing a voltage at a second power connector. The method may include coupling a second power input rail with the first power connector or the second power connector in response to the determined power specification of the circuit board and the sensed voltage at the second power connector.

Example 3

A processor board may include a circuit for power management. The circuit may include a first power connector coupled to a first power input rail. The circuit may include a second power connector. The circuit may include a second power input rail. The circuit may include a power control module. The power control module may determine a power specification of the circuit board. The power control module may detect a power cable connected to the first power connector. The power control module may sense a voltage at the second power connector. The power control module may couple the second power input rail with the first power connector or the second power connector in response to the determined power specification of the circuit board and the sensed voltage at the second power connector.

Although some embodiments have been described in reference to particular implementations, other implementations are possible according to some embodiments. Additionally, the arrangement and order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A circuit for power management on a circuit board, comprising:
   a first power connector coupled to a first power input rail and selectively coupled to a second power rail through a steering module;
   a second power connector selectively coupled to the second power rail through a switch;
   and
   a power control module to:
      determine a power specification of the circuit board;
      detect a power cable connected to the first power connector;
      sense a voltage at the second power connector; and
      if the voltage sensed at the second power connector is zero and the power specification of the circuit board is below a specified threshold, then couple the first power connector to the second power rail to power both the first power rail and the second power rail; and
      otherwise decouple the first power connector from the second power rail to power only the first power rail.

2. The circuit of claim 1, comprising an edge connector coupled to a third power input rail, the edge connector to receive power from a motherboard.

3. The circuit of claim 1, the power control module to sense zero voltage at the second power connector.

4. The circuit of claim 3, the power control module to couple the second power input rail with the first power connector, if a supplied power total meets the determined power specification.

5. The circuit of claim 3, the power control module to decouple the second power input rail from the first power connector, if a supplied power total does not meet the determined power specification.

6. The circuit of claim 1, the power control module to sense a nonzero voltage at the second power connector.

7. The circuit of claim 6, the power control module to couple the second power input rail with the second power connector.

8. A method for power management in a circuit, comprising:
   determining a power specification of a circuit board;
   detecting a power cable connected to a first power connector coupled to a first power input rail and selectively coupled to the second power rail;
   sensing a voltage at a second power connector;
   if the voltage sensed at the second power connector is zero and the power specification of the circuit board is below a specified threshold, coupling the first power connector to the second power rail to power both the first power rail and the second power rail; and otherwise decoupling the first power connector from the second power rail to power only the first power rail.

9. The method of claim 8, comprising sensing zero voltage at the second power connector.

10. The method of claim 9, comprising coupling the second power input rail with the first power connector, if a supplied power total meets the determined power specification.

11. The method of claim 9, comprising decoupling the second power input rail from the first power connector, if a supplied power total does not meet the determined power specification.

12. The method of claim 8, comprising sensing a nonzero voltage at the second power connector.

13. The method of claim 12, comprising coupling the second power input rail with the second power connector.

14. A processor board comprising a circuit for power management, the circuit comprising:
   a first power connector coupled to a first power input rail and selectively coupled to a second power rail through a steering module;
   a second power connector selectively coupled to the second power rail through a switch;
   and
   a power control module to:
      determine a power specification of the processor board;
      detect a power cable connected to the first power connector;
      sense a voltage at the second power connector; and
      if the voltage sensed at the second power connector is zero and the power specification of the circuit board is below a specified threshold, then couple the first power connector to the second power rail to power both the first power rail and the second power rail; and
      otherwise decouple the first power connector from the second power rail to power only the first power rail.

15. The processor of claim 14, comprising an edge connector coupled to a third power input rail, the edge connector to receive power from a motherboard.

16. The processor of claim 14, the power control module to sense zero voltage at the second power connector.

17. The processor of claim 16, the power control module to couple the second power input rail with the first power connector, if a supplied power total meets the determined power specification.

18. The processor of claim 16, the power control module to decouple the second power input rail from the first power connector, if a supplied power total does not meet the determined power specification.

19. The processor of claim 14, the power control module to sense a nonzero voltage at the second power connector.

20. The processor of claim 19, the power control module to couple the second power input rail with the second power connector.

* * * * *